United States Patent [19]

Bechstein et al.

[11] Patent Number: 5,715,057
[45] Date of Patent: Feb. 3, 1998

[54] REFERENCE INTERFEROMETER WITH VARIABLE WAVELENGTH AND FOLDED MEASUREMENT BEAM PATH

[75] Inventors: Karl-Heinz Bechstein; Beate Moeller, both of Jena; Klaus-Dieter Salewski, Greifswald, all of Germany

[73] Assignee: Carl Zeiss Jena GmbH, Jena, Germany

[21] Appl. No.: 666,245

[22] Filed: Jun. 20, 1996

[30] Foreign Application Priority Data

Jun. 20, 1995 [DE] Germany .................... 195 22 263.6

[51] Int. Cl.$^6$ ........................................ G01B 9/02
[52] U.S. Cl. ................................ 356/361; 356/358
[58] Field of Search ........................... 356/361, 363, 356/358, 351, 349

[56] References Cited

FOREIGN PATENT DOCUMENTS 0609456  2/1979  Switzerland .............. 356/361
0858171  1/1961  United Kingdom ........ 356/361

OTHER PUBLICATIONS

"Laser Pressure Guage", Measurement and Control, Nov. 1964, vol. 3, No. 11.

*Primary Examiner*—Samuel A. Turner
*Attorney, Agent, or Firm*—McAulay Fisher Nissen Goldberg & Kiel, LLP

[57] ABSTRACT

The invention is directed to a reference interferometer with variable wavelength, with an interferometer splitter, a reference beam path, and a folded measurement beam path passing between two plane mirrors. At least one spacer element 10 is provided for realizing a fixed position of the plane mirrors relative to one another. The two plane mirrors are arranged in a plurality of planes in a defined manner in relation to one another such that a light beam coming from the interferometer splitter and coupled into the space between the plane mirrors at an entrance point at a slight angle is reflected repeatedly at the plane mirrors, and the reflection points lie along a parabola on the surfaces of the plane mirrors. A retroreflector is arranged downstream of the first plane mirror in such a way that the light beam striking it can be returned to the entrance point or in the vicinity thereof along the same path or almost the same path.

11 Claims, 2 Drawing Sheets

REFERENCE INTERFEROMETER WITH VARIABLE WAVELENGTH AND FOLDED MEASUREMENT BEAM PATH

BACKGROUND OF THE INVENTION a) Field of the Invention

The invention is directed to a reference interferometer (RI) with variable wavelength. It serves as a path reference in an interferometer for high-precision measurement of length.

b) Description of the Related Art

Interferometric measurements of a path length are reduced to the difference in phase angles of the interference signal. There are essentially two different possibilities for interferometric length measurement. At a constant wavelength and variable path difference, the measurement reflector is moved along the path to be measured and the resulting phase change is determined by means of photoelectric detectors. A further possibility of interferometric length measurement with variable wavelength and constant path difference consists in measuring the phase change brought about by the change in wavelength with the measurement reflector remaining stationary. This method is disclosed in U.S. Pat. No. 4,907,886. Interferometry with variable wavelength is also known as "absolute distance interferometry" (ADI), wherein the different wavelengths result either from different spectral lines of a light source or from the continuous tuning of a laser.

Known methods of absolute distance interferometry (ADI) use at least one laser with a tunable wavelength. The particular methods differ from one another with respect to the way of detecting the phase change. Arrangements with two lasers use the heterodyne signal for this purpose and form the necessary phase difference by means of analog circuits such as mixers and filters.

DE-OS 4139839 describes an arrangement based on the superheterodyne principle which permits the beat frequency that can be generated between two single-mode lasers to be determined and allows a distance measurement using a reference interferometer. For this purpose, the wavelength of one of the two lasers is varied monotonically. All of the consequent phase angle changes in the interference signals are recorded. The change in beat frequency and the unknown reflector distance of the measurement interferometer are calculated from the determined phase changes and from the reflector distance of the reference interferometer.

Classical length interferometry (LI) working with constant wavelength and variable path difference reduces the measured phase change to the length standard (light velocity×time) through the optical wavelength. In interferometry with variable wavelengths and constant path difference, the dimensional connection is advantageously realized by comparison measurements with a physical length standard.

With a variable wavelength, the measured distance M can also be connected to the length standard in a simple manner if the phase change $\Phi_M$ observed in the measurement interferometer is put in a ratio to the phase change $\Phi_K$ in a reference interferometer with a known reference distance K. Under specified conditions, this gives the equation $M/K = \Phi_M/\Phi_K$.

The measurement uncertainty depends, among other things, on the relative resolution in K so that for practical applications the magnitude of the path K must be approximately $10^7$ phase measurement steps. The constant reflector distance realized within the reference interferometer is multiplied by a long light path which is achieved between two plane mirrors as a result of multiple reflections.

A method and a device in which the light exits the device through its entrance aperture again after repeated reflection at two concave mirrors are described in "Physik in unserer Zeit [Physics in Our Time]", 16 (1985), 5; pages 141 to 143. Very large light paths can be realized in this arrangement, since the divergence of the laser light is compensated for by the mirror shape. The use of such an arrangement for absolute distance interferometry is disadvantageous due to the high cost. Moreover, the spacer must not screen the beam path running through the interior from the surrounding atmosphere. Another disadvantage consists in that the direction of the exiting light beam differs from the direction of the entering light beam.

OBJECT AND SUMMARY OF THE INVENTION

The primary object of the present invention is to provide a RI with variable wavelength which realizes a required long optical path in the free atmosphere within the smallest space and has a highly stability.

According to the invention, this object is met in a reference interferometer with variable wavelength having an interferometer splitter, a reference beam path, and a folded measurement beam path passing between two plane mirrors, at least one spacer element being provided for realizing a fixed position of the plane mirrors relative to one another. The invention comprises an improvement wherein the two plane mirrors are arranged in a plurality of planes in a defined manner in relation to one another such that a light beam coming from the interferometer splitter and coupled with the space between the plane mirrors at an entrance point at a slight angle is reflected repeatedly at the plane mirrors. The reflection points lie along a parabola on the surfaces of the plane mirrors. A retroflector is arranged downstream of the first plane mirror in such a way that the light beam striking it can be returned to the entrance point or in the vicinity thereof along the same or almost the same path.

An advantageous construction of the invention consists in the use of plane mirrors arranged in a first plane Y–Z of the Cartesian coordinate system at an inclination angle of $\phi$ at the spacer element, wherein the coordinate origin of the coordinate system lies approximately at the entrance point of the light beam and the X–Y plane is the plane in which the first plane mirror is located. The light beam enters the space between the plane mirrors in the Y–Z plane at an angle $\gamma$ relative to the mirror normal. In a second plane X–Z extending vertically to the first plane, the light beam is at an inclination $\alpha$ to the plane and the two plane mirrors enclose an inclination angle $\delta$ in this plane. In this way, the light beam is reflected repeatedly between the plane mirrors which are inclined relative to one another and is subsequently so deflected by means of the retroreflector arranged in the measurement beam path that after repeatedly passing through the mirrors it exits the arrangement again so as to be parallel to itself. The parallelism of the returning light beam relative to the emitted light beam which is achieved in this way substantially determines the contrast of the interference signal.

As a result of the inclination of the plane mirrors relative to one another and the inclination of the incident light beam relative to the normal at the point of incidence in two planes, the reflection points on the surfaces of the plane mirrors lie on a parabola. This beam path has the advantage that the reflections at the entrance point and exit point of the beam folding arrangement (plane mirror arrangement) are spatially separated. However, these reflections are spatially superposed within these mirrors so that a particularly compact arrangement is achieved.

The retroreflectors are advantageously designed as triple reflectors or spherical reflectors so that the returning light beam is sufficiently parallel to the advancing light beam.

A further advantage consists in that as a result of the double-T-shaped design of the arrangement comprising the spacer and plane mirrors, the folded light beam can be guided outside of the spacer without interference by the spacer and without blocking the access of the surrounding medium.

The plane mirror is attached to the spacer so as to maintain a stable distance and a robust construction is achieved by means of a material engagement such as gluing, welding, soldering or by wringing together.

A further possibility is to design the spacer element as a hollow body and to guide the folded beam path within this hollow body. In this way, defined environmental conditions are also realized for this beam path.

Further, a very robust design of the RI results when the interferometer splitter is connected with one of the plane mirrors and the measurement reflector and reference reflector are connected with the other plane mirror. In this construction, the optical paths of the measurement beam path and reference beam path differ only by the amount of the folded light beam length. Further, thermal length changes compensate one another outside the folded light path in both beam paths in such an arrangement.

The invention will be explained more fully in the following with reference to an embodiment example.

DESCRIPTION OF THE PREFERRED EMBODIMENTS

Figure 1:
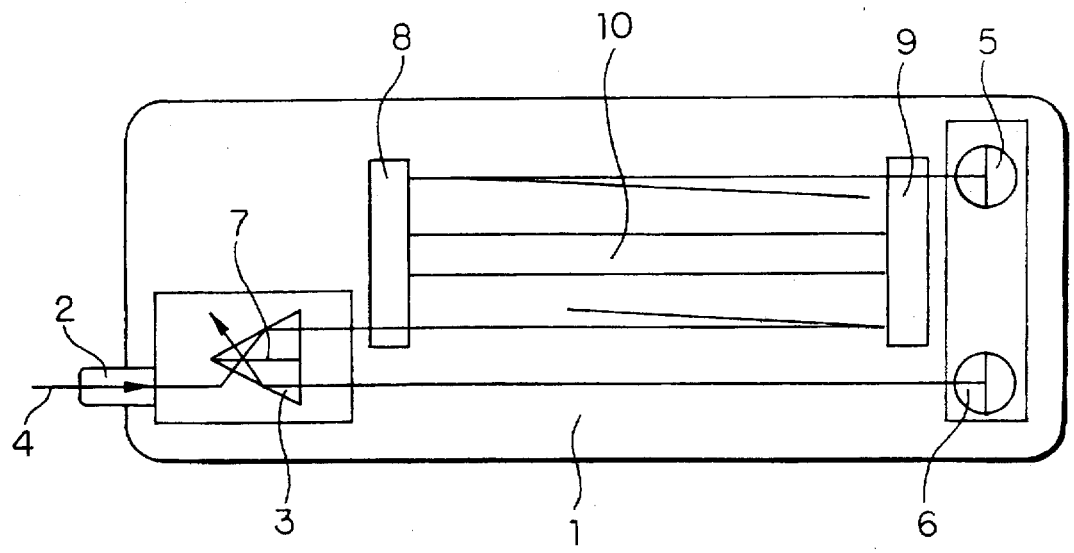
FIG. 1 shows a reference interferometer according to the invention.

As is shown in FIG. 1, the individual structural component parts of the reference interferometer are arranged on a dimensionally stable base plate 1. An interferometer splitter 3 which can be, e.g., a Kösters prism, known per se, is arranged on this base plate 1 downstream of a collimating objective 2 serving as a coupling objective. This interferometer splitter 3 divides the light beam introduced by a light guide 4 via the collimator objective 2 into a measurement beam path M and a reference beam path R. A measurement reflector 5 and a reference reflector 6 which are advantageously designed as triple reflectors or spherical reflectors are provided at the end of the base plate 1 remote of the interferometer splitter 3 in the measurement beam path and reference beam path, respectively, at a constant distance from the splitter surface 7 of the interferometer splitter 3.

Figure 2:
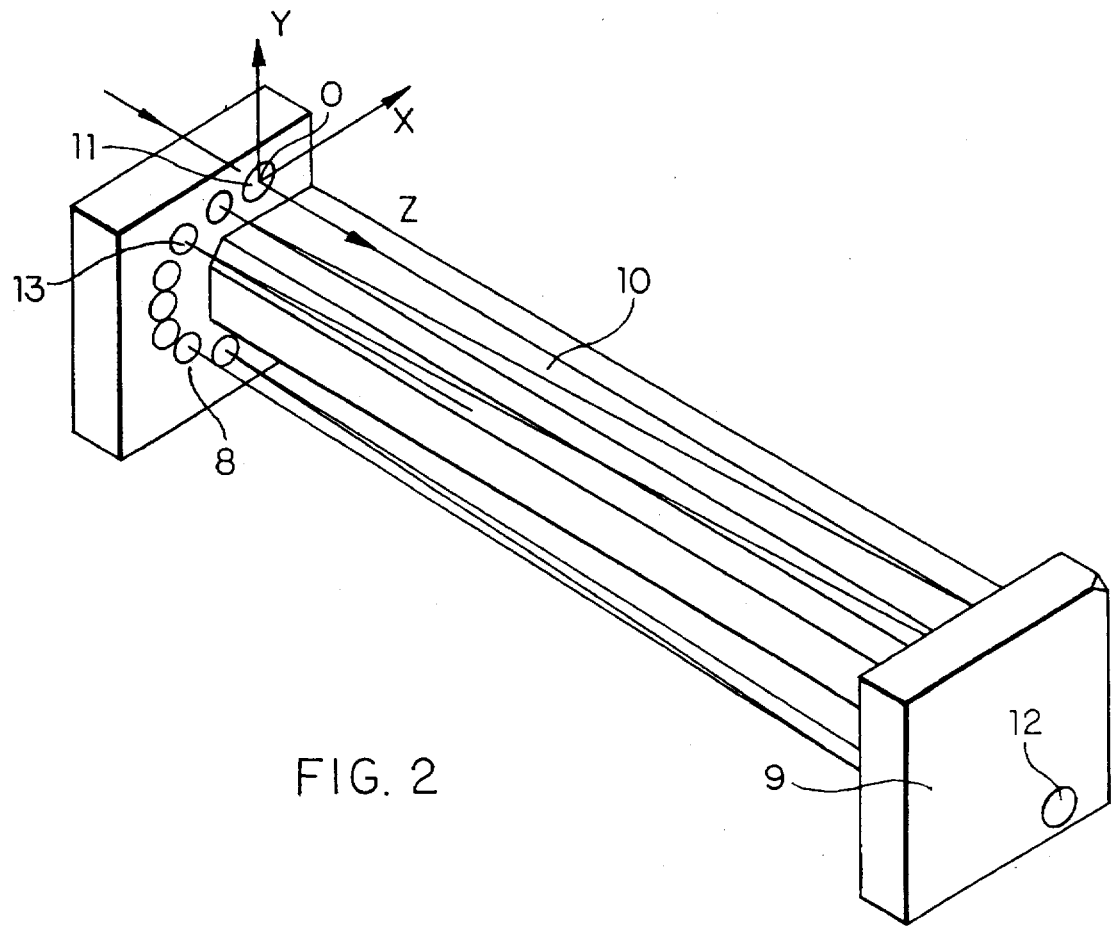
FIG. 2 shows an arrangement according to the invention for beam folding with plane mirrors and spacers.
Figure 3:
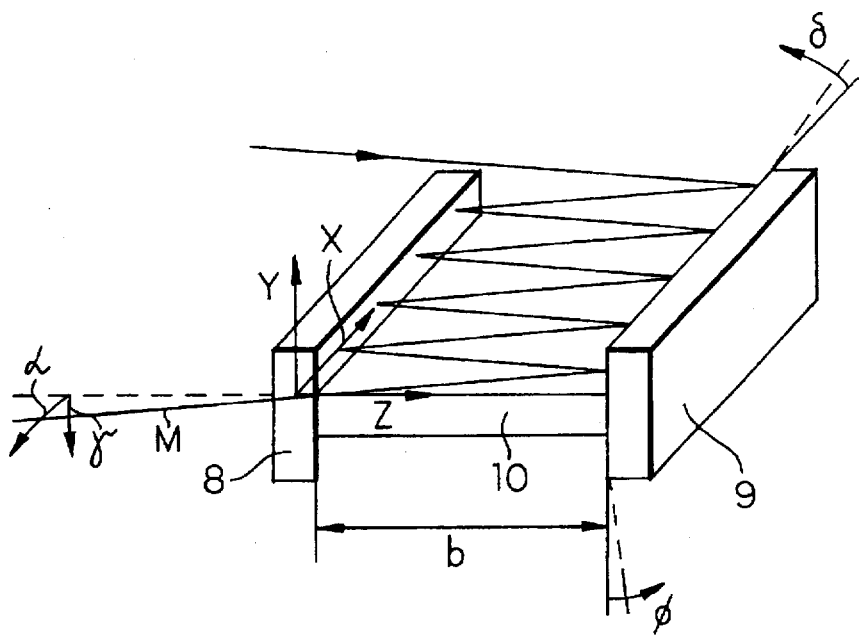
FIG. 3 shows a folded beam path between the plane mirrors to illustrate the coordinate system and angular ratios.

An arrangement for folding the measurement beam path which includes two plane mirrors 8 and 9 and a spacer element 10 is provided in the measurement beam path M between the interferometer splitter 3 and the measurement reflector 5 (FIGS. 2 and 3). The element 10 which is preferably formed of a thermally invariant and non-aging material such as Invar or a glass-ceramic material ensures a constant distance b between the two plane mirrors 8 and 9. For this purpose, the interference splitter 3 and the measurement reflector 5 and reference reflector 6 are advantageously arranged with respect to one another and to the arrangement for the folding of the measurement beam path M such that the optical path lengths in the measurement beam path and reference beam path differ only by the folded beam length. This can be achieved, for example, in that the second plane mirror 8 is connected with the interferometer splitter 3 and the measurement reflector 5 and reference reflector 6 are connected with the first plane mirror 9. In this way, e.g. thermal length changes in connecting elements act identically in both beam paths and accordingly compensate for one another.

The arrangement for folding the measurement beam path M shown in FIG. 2 comprises the second plane mirror 8 with a beam entrance aperture 11 and the first plane mirror 9 with a beam exit aperture 12. The spacer element 10 is arranged between the plane mirrors 8 and 9. The plane mirrors 8 and 9 are attached to the ends of the spacer element 10 by means of a material engagement or by wringing together. For example, the plane mirrors 8 and 9 can be connected in a stable manner with element 10 by means of gluing, welding, soldering and the like.

The light beam coming from the splitter surface 7 of the interferometer splitter 3 enters the space between the plane mirrors 8 and 9 through the entrance aperture 11 and after repeated reflection on the surfaces of the plane mirrors 8 and 9 exits the space between the plane mirrors through the beam outlet aperture 12 and strikes the measurement reflector 5 arranged downstream. The light beam is thrown back again by this measurement reflector 5 so that it returns to the splitter surface 7 on the same path or on approximately the same path. The locations where the reflections take place on the plane mirror surfaces lie on a parabolic curve as shown by the reflection images (reflection points) 13 indicated by circles in FIG. 2. With suitable dimensioning of the angles in connection with the mirror distance, a particularly compact construction can be achieved in that the reflection images are spatially separated from the respective adjacent reflection image only at the entrance point O and at the exit location 12 of the light beam (FIG. 2). In this case, the folded beam is guided outside of the spacer element 10.

Figure 4:
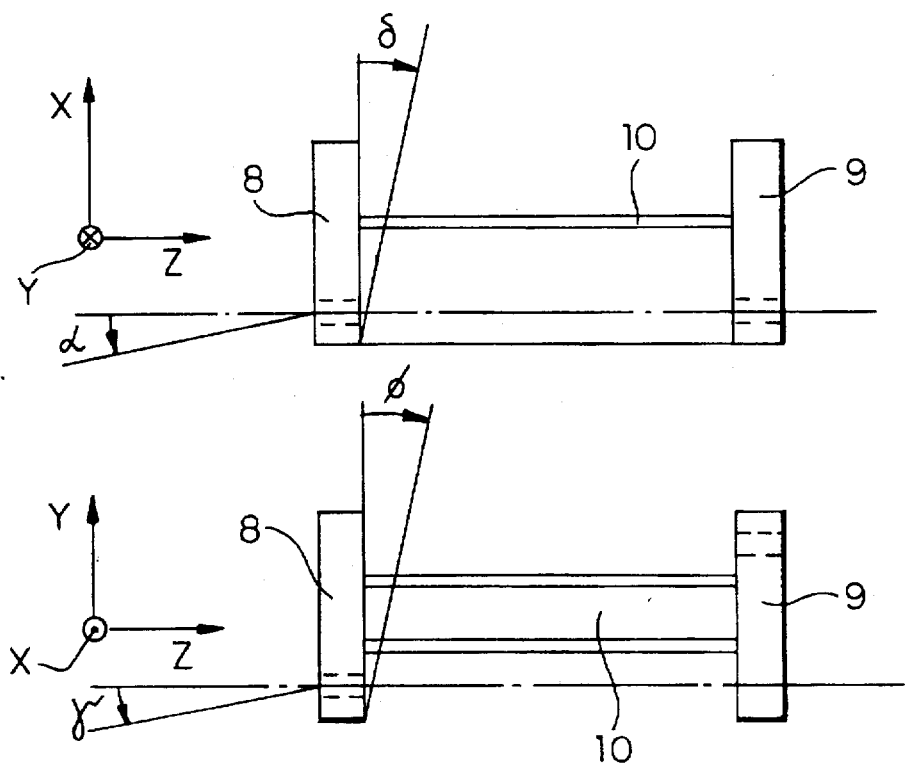
FIG. 4 contains a plan view and top view of the beam folding arrangement, according to the invention, showing the angular ratios.

FIGS. 3 and 4 show the angular ratios which are to be realized in order for the proposed object to be met. In order to explain this, a coordinate system X, Y, Z with the coordinate origin O at the point where the light beam enters the space between the plane mirrors 8 and 9 is so appointed that the first plane mirror 8 is situated as reference plane in the X-Y plane. The two plane mirrors 8 and 9 are inclined relative to one another in a defined manner in two planes (X-Z plane and Y-Z plane). Thus, the plane mirrors 8 and 9 enclose a small angle φ in the Y-Z plane and an angle δ in the X-Z plane. The angle of inclination of the light beam relative to the normal at the point of incidence in the two planes, i.e., the angle at which the light beam enters the space between the plane mirrors 8 and 9, is angle γ in the Y-Z plane and angle α in the X-Z plane. Angles α and γ and angles δ and φ are so dimensioned that the reflection points of the light beam and accordingly the reflection images 13 lie on a parabolic curve on the surfaces of the plane mirrors 8 and 9 (FIG. 2).

A beam path which is guided in this way has the advantage that the reflections at the entry point and exit point of the comparison path (path of the light beam between the plane mirrors 8 and 9) are spatially separated. However, they are spatially superposed within the mirror. A particularly compact arrangement is realized in this way.

The measurement reflector 5 which is preferably designed as a triple reflector or spherical reflector and is arranged downstream of the second plane mirror 9 in FIG. 2 ensures that the returning light beam is extensively parallel to the advancing light beam, wherein a defined offset can also be adjusted between the advancing light beam and the returning light beam.

The orders of magnitude of the angles to be adjusted are illustrated in a numerical example. In arc seconds:
$\alpha = 3840''$
$\gamma = -900''$
$\delta = 240''$
$\phi = 0''$,
wherein other angle combinations are also possible.

According to another embodiment form, not shown, the spacer element 10 can also be constructed as a closed or open hollow body so that the folded measurement beam path M can be guided within this element so as to be screened, for example.

Another advantage of the arrangement according to the invention consists in that changes in the optical path in the reference interferometer caused, for example, by bending of the spacer element or thermal changes at the light entry point, are indicated by a creeping of the exiting reflections.

While the foregoing description and drawings represent the preferred embodiments of the present invention, it will be obvious to those skilled in the art that various changes and modifications may be made therein without departing from the true spirit and scope of the present invention.

What is claimed is:

1. A reference interferometer with variable wavelength comprising:

an interferometer splitter;

a reference beam path;

a folded measurement beam path passing between first and second plane mirrors;

at least one spacer element being provided for realizing a fixed position of said plane mirrors relative to one another;

said first and second plane mirrors being arranged in a plurality of planes in a defined manner in relation to one another such that a light beam coming from the interferometer splitter and coupled into the space between the plane mirrors at an entrance point at a slight angle is reflected repeatedly at said plane mirrors, reflection points lying along a parabola on the surfaces of said plane mirrors; and a retroreflector arranged downstream of said first plane mirror so that the light beam striking it can be returned to the entrance point or the vicinity thereof along the same or almost the same path.

2. The reference interferometer according to claim 1, wherein the direction in which the light beam of the measurement beam path enters the space between the plane mirrors and the position of the plane mirrors relative to one another are appointed in a coordinate system X; Y; Z in which the entrance location corresponds to the coordinate origin and the reflecting surfaces of the plane mirror lie in the plane X–Y so that the entrance direction of the light beam encloses an inclination angle $\gamma$ with plane X–Z and an inclination angle $\alpha$ with plane Y–Z and the reflecting surface of the plane mirror is inclined relative to the reflecting surface of the plane mirror at an angle $\phi$ as measured in the Y–Z plane and at an angle $\delta$ as measured in the X–Z plane.

3. The reference interferometer according to claim 1, wherein said spacer element is formed of a material which is resistant to aging and is thermally invariant.

4. The reference interferometer according to claim 1, wherein the spacer element and the first and second plane mirrors form a double-T-shaped arrangement, and wherein the folded light beam is guided outside of the spacer element.

5. The reference interferometer according to claim 1, wherein the spacer element is designed as a hollow body with at least one beam entrance aperture and at least one beam exit aperture, and wherein the folded light beam is guided within the hollow body.

6. The reference interferometer according to claim 1, wherein the plane mirrors are connected with the spacer element via a material engagement.

7. The reference interferometer according to claim 1, wherein the plane mirrors are connected with the spacer element by wringing together.

8. The reference interferometer according to claim 1, wherein the light can be coupled into the interferometer splitter of the interferometer via light-conducting fibers.

9. The reference interferometer according to claim 1, wherein the interferometer splitter is connected with the second plane mirror and said retroreflector is connected with the first plane mirror.

10. The reference interferometer according to claim 1, wherein all elements of this interferometer are arranged on a common base.

11. The reference interferometer according to claim 1, wherein the distance of the reflection images at the entrance point and exit point of the light beam is greater than or equal to the diameter of the light beam and is smaller than the diameter of the light beam within the space between the plane mirrors.

* * * * *